(12) United States Patent
Desai et al.

(10) Patent No.: US 7,548,727 B2
(45) Date of Patent: Jun. 16, 2009

(54) METHOD AND SYSTEM FOR AN EFFICIENT IMPLEMENTATION OF THE BLUETOOTH® SUBBAND CODEC (SBC)

(75) Inventors: Prasanna Desai, Olivenhain, CA (US); Siwei Tang, San Diego, CA (US)

(73) Assignee: Broadcom Corporation, Irvine, CA (US)

( * ) Notice: Subject to any disclaimer, the term of this patent is extended or adjusted under 35 U.S.C. 154(b) by 603 days.

(21) Appl. No.: 11/258,635

(22) Filed: Oct. 26, 2005

(65) Prior Publication Data

US 2007/0093206 A1    Apr. 26, 2007

(51) Int. Cl.
    *H04B 7/00*      (2006.01)
(52) U.S. Cl. .................. 455/41.2; 455/3.06; 455/177.1; 455/48; 455/418; 364/725; 364/514; 375/242
(58) Field of Classification Search .............. 455/41.2, 455/3.06, 177.1, 48, 418; 364/725, 514; 375/242

See application file for complete search history.

(56) References Cited

U.S. PATENT DOCUMENTS

| | | | | |
|---|---|---|---|---|
| 5,508,949 A * | 4/1996 | Konstantinides | ............ | 708/402 |
| 5,684,829 A * | 11/1997 | Kizuki et al. | ................ | 375/242 |
| 5,731,767 A * | 3/1998 | Tsutsui et al. | ................. | 341/50 |
| 6,134,631 A * | 10/2000 | Jennings, III | ................ | 711/117 |
| 6,671,414 B1 * | 12/2003 | Micchelli et al. | ............ | 382/250 |
| 6,678,423 B1 * | 1/2004 | Trenary et al. | .............. | 382/250 |
| 6,782,366 B1 * | 8/2004 | Huang et al. | ................ | 704/500 |
| 2001/0001615 A1 * | 5/2001 | Bailleul | ....................... | 375/242 |
| 2002/0173952 A1 * | 11/2002 | Mietens et al. | .............. | 704/219 |
| 2005/0108307 A1 * | 5/2005 | Kuromaru et al. | ........... | 708/209 |
| 2005/0254586 A1 * | 11/2005 | Kim et al. | .................... | 375/242 |
| 2007/0033494 A1 * | 2/2007 | Wenger et al. | .............. | 714/776 |
| 2008/0031365 A1 * | 2/2008 | Garudadri et al. | ........... | 375/242 |
| 2008/0071528 A1 * | 3/2008 | Ubale et al. | .................. | 704/220 |

OTHER PUBLICATIONS

Appendix B: Technical Specification of SBC; Bluetooth Specification, Advanced Audio Distribution Profile, Release Date May 22, 2003, pp. 50-71.

(Continued)

*Primary Examiner*—Matthew D Anderson
*Assistant Examiner*—Minh D Dao
(74) *Attorney, Agent, or Firm*—McAndrews, Held & Malloy, Ltd.

(57) ABSTRACT

Certain aspects of a method and system for implementing a codec may comprise at least one of inverse discrete cosine transforming windowed data corresponding to a plurality of input audio samples during encoding by a Bluetooth subband codec and discrete cosine transforming shifted subband samples during decoding by the Bluetooth subband codec. The input audio samples may be reconstructed from the discrete cosine transforming of the shifted subband samples. The inverse discrete cosine transforming may be executed during a matrix operation of the encoding. The discrete cosine transforming may be executed during a matrix operation of the decoding. The input audio samples may be windowed during the encoding via a plurality of delay lines. A vector may be generated during a matrix operation of the decoding. The audio data associated with the generated vector may be windowed by a plurality of filter coefficients via a plurality of delay lines.

27 Claims, 9 Drawing Sheets

OTHER PUBLICATIONS

K. Konstantinides, Fast Subband Filtering in MPEG Audio Coding, IEEE Signal Processing Letters, vol. 1, No. 2, Feb. 1994, pp. 26-28.

B. G. Lee, A New Algorithm to Compute the Discrete Cosine Transform, IEEE Transactions on Acoustics, Speech, and Signal Processing, vol. ASSP-32, No. 6, Dec. 1984, pp. 1243-1245.

* cited by examiner

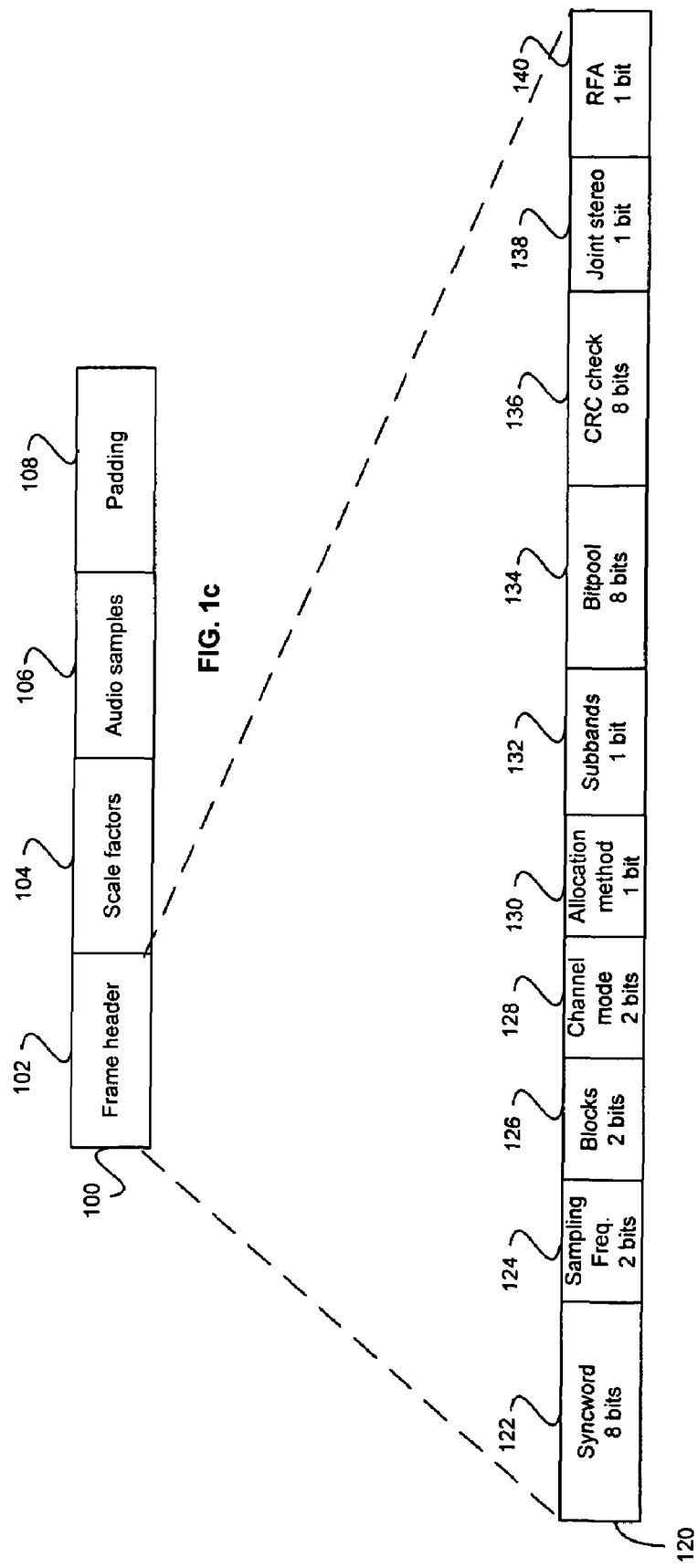

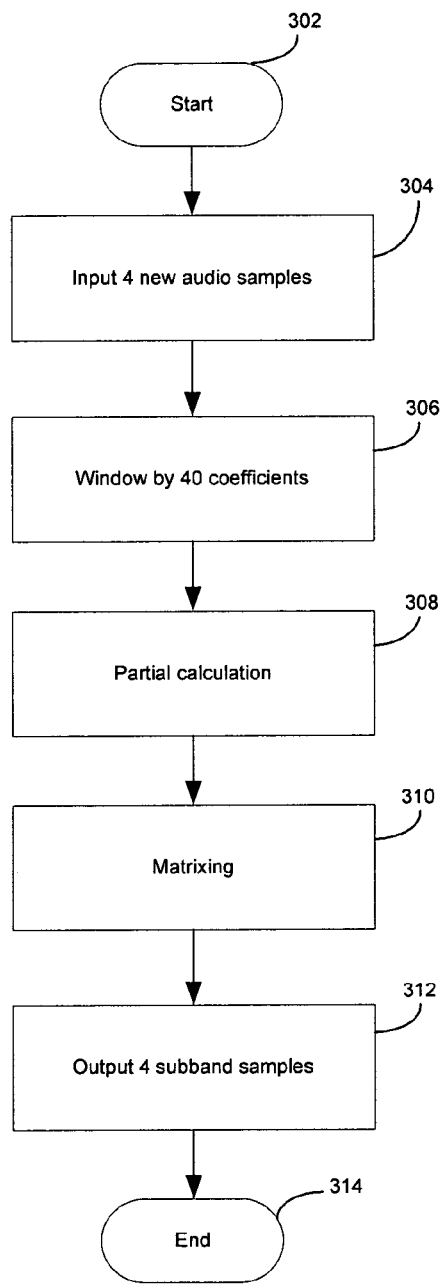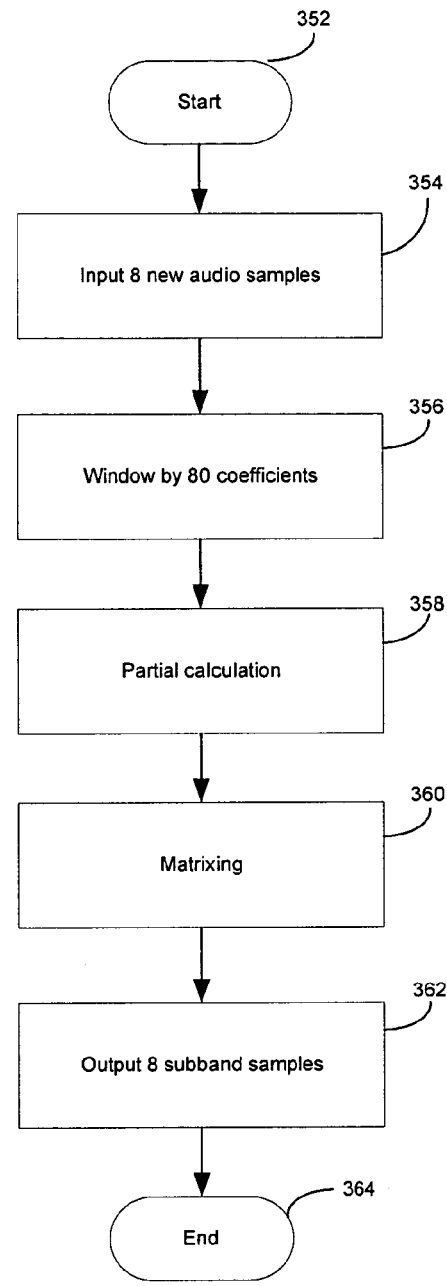
FIG. 3a
FIG. 3b

METHOD AND SYSTEM FOR AN EFFICIENT IMPLEMENTATION OF THE BLUETOOTH® SUBBAND CODEC (SBC)

CROSS-REFERENCE TO RELATED APPLICATIONS/INCORPORATION BY REFERENCE

Not applicable

FIELD OF THE INVENTION

Certain embodiments of the invention relate to Bluetooth communication. More specifically, certain embodiments of the invention relate to a method and system for an efficient implementation of the Bluetooth subband codec (SBC).

BACKGROUND OF THE INVENTION

Bluetooth is an international open standard that allows devices to wirelessly communicate with each other. Bluetooth is a short-range wireless technology that allows Bluetooth enabled devices such as computers, cell phones, keyboards and headphones to establish connections without using wires or cables to couple the devices to each other. Bluetooth is currently incorporated into numerous commercial products including desktop computers, laptops, PDAs, cell phones, keyboards, headsets and printers, with more products being constantly added to the list of Bluetooth enabled devices.

The Bluetooth SBC is a low computational complexity audio coding system designed to provide high quality audio at moderate bit rates to Bluetooth enabled devices. The Bluetooth SBC system utilizes a cosine modulated filterbank, for example, for analysis and synthesis. The filterbank may be configured for 4 subbands or 8 subbands, for example. The subband signals may be quantized using a dynamic bit allocation scheme and block adaptive pulse code modulation (PCM) quantization. The number of bits available and the number of bits used for quantization may vary, thereby making the overall bit-rate of the SBC system adjustable. This is advantageous for use in wireless applications where the available wireless bandwidth for audio, and the maximum possible bit-rate may vary over time.

The Bluetooth community has developed specifications that define how to use streaming audio over a Bluetooth link. This opens up Bluetooth technology to a whole new class of audio devices, such as wireless stereo headsets, wireless speakers, and wireless portable MP3 players just to name a few. With the introduction of new Bluetooth specifications for streaming audio, new Bluetooth products such as wireless stereo headsets and wireless file streaming applications are becoming a reality. Wireless applications require solutions that are increasingly low power in order to extend battery life and provide a better end user experience. With existing systems, the computational requirements of high fidelity audio coding may make it cost prohibitive and challenging to add features such as streaming music to wireless devices.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A method and system for an efficient implementation of the Bluetooth subband codec (SBC), substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 1c is a diagram illustrating an exemplary Bluetooth audio frame format that may be utilized in connection with an embodiment of the invention.

FIG. 1d is a diagram illustrating the exemplary frame header format of FIG. 1c, which may be utilized in connection with an embodiment of the invention.

FIG. 3a is a flowchart illustrating exemplary steps for Bluetooth SBC analysis for 4 subbands that may be utilized in connection with an embodiment of the invention.

FIG. 3b is a flowchart illustrating exemplary steps for Bluetooth SBC analysis for 8 subbands that may be utilized in connection with an embodiment of the invention.

DETAILED DESCRIPTION OF THE INVENTION

Certain aspects of a method and system for implementing a codec may comprise at least one of inverse discrete cosine transforming windowed data corresponding to a plurality of input audio samples during encoding by a Bluetooth subband codec and discrete cosine transforming shifted subband samples during decoding by the Bluetooth subband codec. The input audio samples may be reconstructed from the discrete cosine transforming of the shifted subband samples. The inverse discrete cosine transforming may be executed during a matrix operation of the encoding. The discrete cosine transforming may be executed during a matrix operation of the decoding. The input audio samples may be windowed during the encoding via a plurality of delay lines. A vector may be generated during a matrix operation of the decoding. The audio data associated with the generated vector may be windowed by a plurality of filter coefficients via a plurality of delay lines.

Figure 1A:
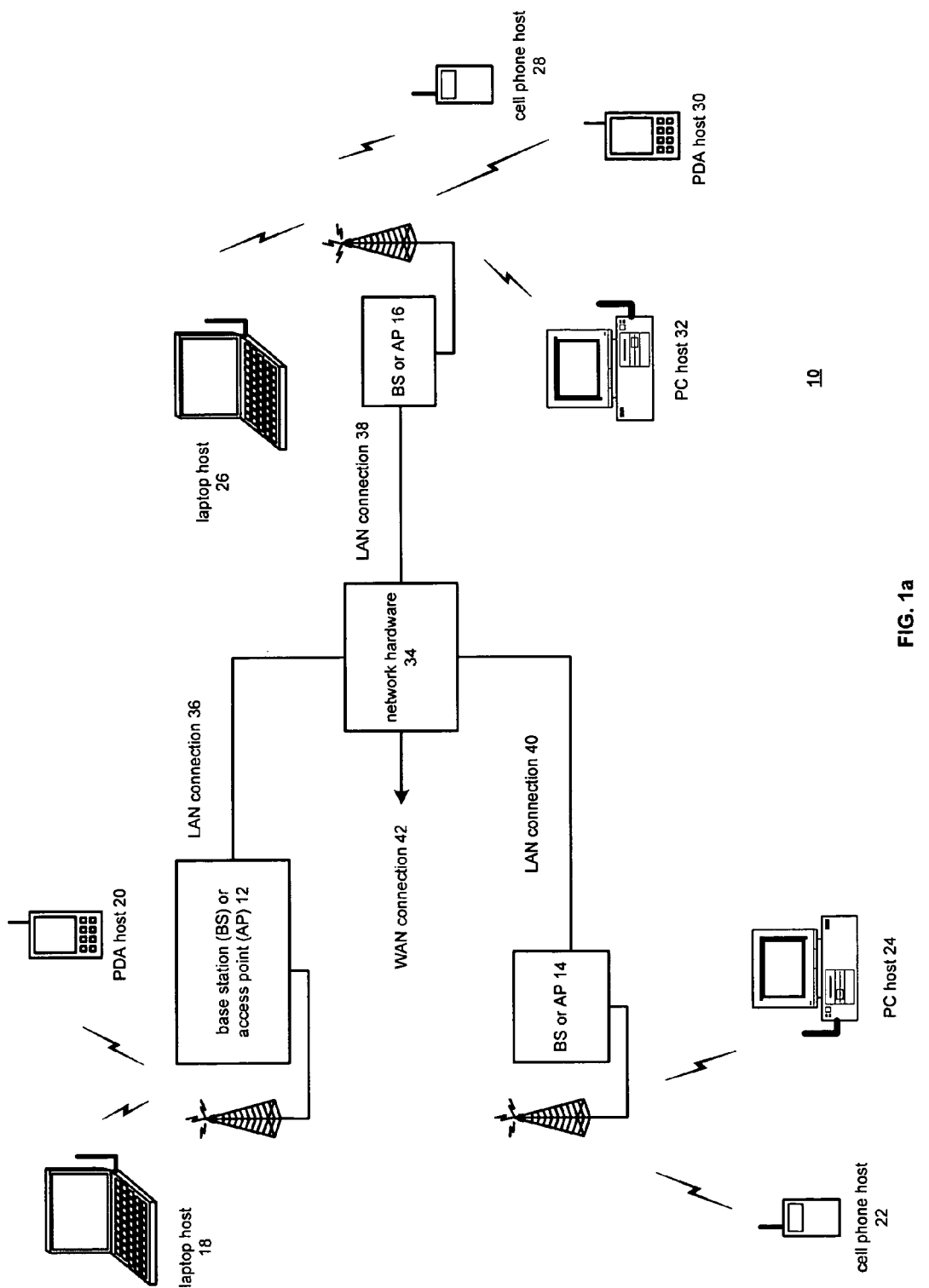
FIG. 1a illustrates a block diagram of a wireless communication system in accordance with an embodiment of the present invention.

FIG. 1a illustrates a block diagram of a wireless communication system in accordance with an embodiment of the present invention. Referring to FIG. 1a, there is shown a block diagram of a communication system 10 that comprises a plurality of base stations and/or access points 12-16, a plurality of wireless communication devices 18-32 and a network hardware component 34. The wireless communication devices 18-32 may be laptop computers 18 and 26, personal digital assistants 20 and 30, personal computers 24 and 32 and/or cellular telephones 22 and 28. The details of the wireless communication devices will be described in greater detail with reference to FIG. 1b.

The base stations or access points 12-16 may be operably coupled to the network hardware 34, for example, via local area network connections 36, 38 and 40. The network hardware 34, for example, a router, switch, bridge, modem, or system controller, may provide a wide area network connection 42 for the communication system 10. Each of the base stations or access points 12-16 may have an associated antenna or antenna array to communicate with the wireless communication devices in its area. Typically, the wireless communication devices may register with a particular base station or access point 12-16 to receive services from the communication system 10. For direct connections, for example, point-to-point communications, wireless communication devices may communicate directly via an allocated channel.

Typically, base stations are used for cellular telephone systems and similar type of systems, while access points are used for in-home or in-building wireless networks, although those terms are often used interchangeably. Regardless of the particular type of communication system, each wireless communication device includes a built-in radio and/or is coupled to a radio.

Figure 1B:
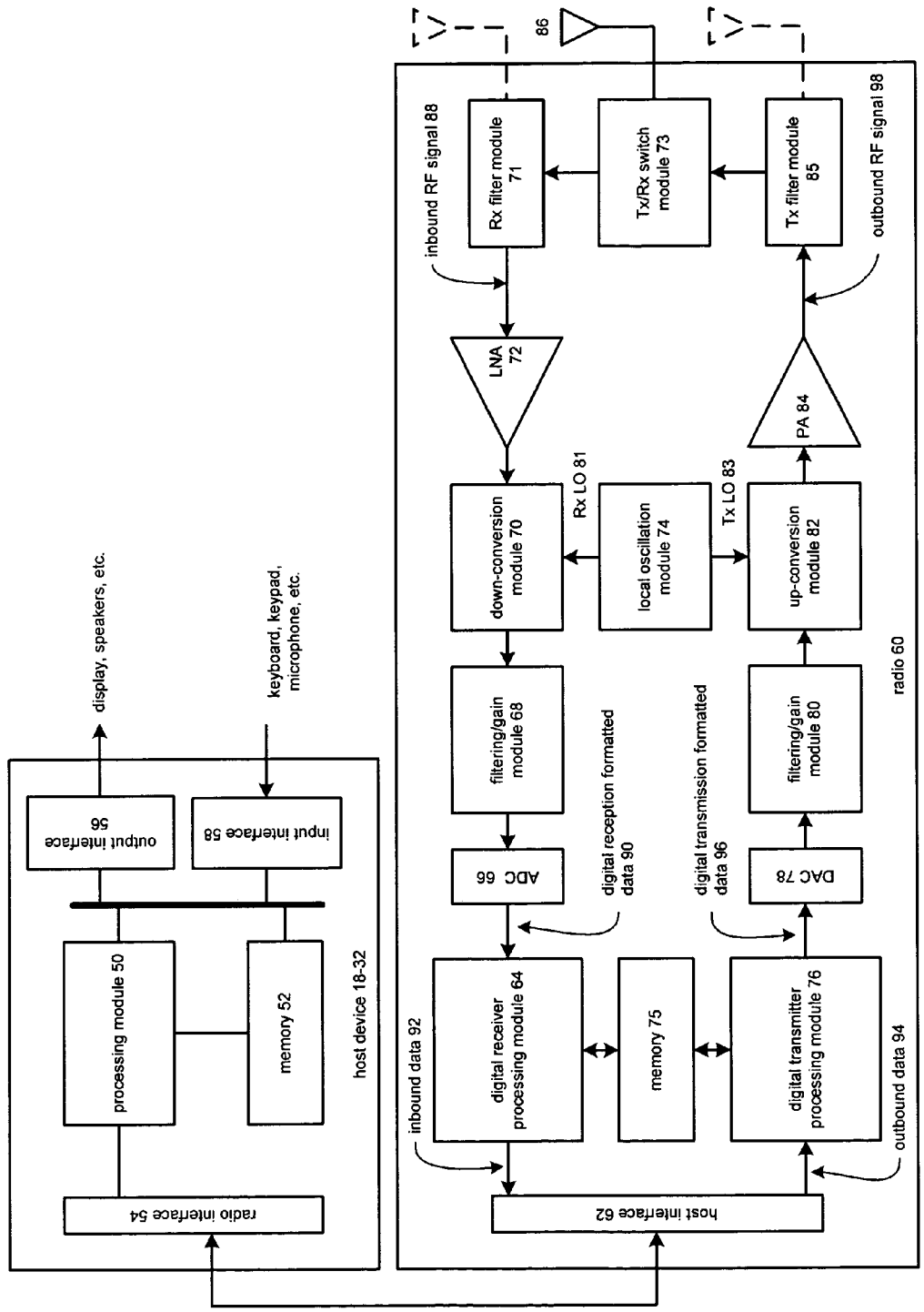
FIG. 1b illustrates a block diagram of a wireless communication device in accordance with an embodiment of the present invention.

FIG. 1b illustrates a block diagram of a wireless communication device, in accordance with an embodiment of the invention. Referring to FIG. 1b, there is shown the devices 18-32 and an associated radio 60. For cellular telephones, the radio 60 may be an integrated or a built-in component. For personal digital assistants (PDAs), laptops, and/or personal computers, the radio 60 may be a built-in or an externally coupled component. For example, the radio may be a plug-in card that may be coupled via a USB interface or other suitable interface As illustrated, the device 18-32 may include a processing module 50, a memory 52, a radio interface 54, an output interface 56 and an input interface 58. The processing module 50 and the memory 52 may execute corresponding instructions that may be typically executed by a device. For example, for a cellular telephone device, the processing module 50 may perform the corresponding communication functions in accordance with a particular cellular telephone standard.

The radio interface 54 may be adapted to allow data to be received from and sent to the radio 60. For data received from the radio 60, for example, inbound data, the radio interface 54 may provide the data to the processing module 50 for further processing and/or routing to the output interface 56. The output interface 56 may provide connectivity to an output display device, for example, a display, a monitor, or speakers, such that the received data may be output. The radio interface 54 also provides outbound data from the processing module 50 to the radio 60. The processing module 50 may receive the outbound data from an input device, for example, a keyboard, a keypad, or a microphone, via the input interface 58. The processing module 50 may generate the data itself. For data received via the input interface 58, the processing module 50 may perform a corresponding function on the data and/or route it to the radio 60 via the radio interface 54.

Radio 60 may comprise an interface 62, a receiver section, a transmitter section, local oscillator module 74, an antenna switch 73, and an antenna 86. The receiver section may comprise a digital receiver processing module 64, analog-to-digital converter 66, filtering/gain module 68, down conversion module 70, receiver filter module 71, low noise amplifier 72, and at least a portion of memory 75. The transmitter section may include a digital transmitter processing module 76, a digital-to-analog converter 78, a filtering/gain module 80, an up-conversion module 82, a power amplifier 84, a transmitter filter module 85, and at least a portion of memory 75. The antenna 86 may be a single antenna that is shared by both the transmit and receive paths via the antenna switch 73. Alternatively, there may be separate antennas for the transmit path and receive path and antenna switch 73 may be omitted. The antenna implementation may depend on the particular standard to which the wireless communication device is compliant.

The digital receiver processing module 64 and the digital transmitter processing module 76, in combination with operational instructions stored in memory 75, may execute digital receiver functions and digital transmitter functions, respectively. The digital receiver functions may include, but are not limited to, digital intermediate frequency to baseband conversion, demodulation, constellation demapping, decoding, and/or descrambling. Another digital receiver function may be estimating DC offsets. The digital transmitter functions may include, but are not limited to, scrambling, encoding, constellation mapping, modulation, and/or digital baseband to IF conversion. The digital receiver and transmitter processing modules 64 and 76 may be implemented using a shared processing device, individual processing devices, or a plurality of processing devices. Such a processing device may be a microprocessor, micro-controller, digital signal processor (DSP), microcomputer, central processing unit, field programmable gate array (FPGA), application specific integrated circuit (ASIC), programmable logic device (PLD), state machine, logic circuitry, analog circuitry, digital circuitry, and/or any device that manipulates analog and/or digital signals based on operational instructions. The memory 75 may be a single memory device or a plurality of memory devices. Such a memory device may be a read-only memory, random access memory, volatile memory, non-volatile memory, static memory, dynamic memory, flash memory, and/or any device that stores digital information. Note that if the processing module 64 and/or 76 implements one or more of its functions via a state machine, analog circuitry, digital circuitry, and/or logic circuitry, the memory storing the corresponding operational instructions may be embedded with the circuitry comprising the state machine, analog circuitry, digital circuitry, and/or logic circuitry.

In operation, the radio 60 may be adapted to receive outbound data 94 from the device via the interface 62. The interface 62 routes the outbound data 94 to the digital transmitter processing module 76, which processes the outbound data 94 in accordance with a particular wireless communication standard, for example, IEEE 802.11a, IEEE 802.11b, or Bluetooth, to produce a digital transmission formatted data 96. The digital transmission formatted data 96 may be a digital baseband signal or a digital low IF signal whose modulation frequency may be in the range of zero hertz to a few megahertz.

The digital-to-analog converter 78 may be adapted to convert the digital transmission formatted data 96 from digital domain to analog domain. The filtering/gain module 80 may filter and/or adjust the gain of the analog signal prior to providing it to the up-conversion module 82. The up-conversion module 82 may directly convert the analog baseband or low IF signal into an RF signal based on a transmitter local oscillator signal provided by local oscillator module 74, which may be implemented in accordance with the teachings of the present invention. The power amplifier 84 may amplify the RF signal to produce an outbound RF signal 98, which may be subsequently filtered by the transmitter filter module 85. The antenna 86 may transmit the outbound RF signal 98 to a targeted device such as a base station, an access point and/or another wireless communication device.

The radio 60 may receive an inbound RF signal 88 via the antenna 86 that was transmitted by a base station, an access point, or another wireless communication device. The antenna 86 may provide the inbound RF signal 88 to the receiver filter module 71, which may filter the inbound RF signal 88 and provide a filtered RF signal to the low noise amplifier 72. The low noise amplifier 72 may amplify the filtered RF signal and provide an amplified inbound RF signal to the down conversion module 70, which may directly convert the amplified inbound RF signal into an inbound low IF signal. The down conversion module 70 may provide the inbound low IF signal to the filtering/gain module 68, which may filter and/or adjust the gain of the signal before providing it to the analog to digital converter 66.

The analog-to-digital converter 66 may convert the filtered inbound low IF signal from the analog domain to the digital domain to produce digital reception formatted data 90. The digital receiver processing module 64 may decode, descramble, demap, and/or demodulate the digital reception formatted data 90 to recapture inbound data 92 in accordance with the particular wireless communication standard being implemented by radio 60. The interface 62 may provide the recaptured inbound data 92 to the devices 18-32 via the radio interface 54.

The radio may be implemented in a variety of ways to receive RF signals and to transmit RF signals, and may be implemented using a single integrated circuit or multiple integrated circuits. Further, at least some of the modules of the radio 60 may be implemented on the same integrated circuit with at least some of the modules of the devices 18-32.

FIG. 1c is a diagram illustrating an exemplary Bluetooth audio frame format that may be utilized in connection with an embodiment of the invention. Referring to FIG. 1c, there is shown an audio frame format 100. The audio frame format 100 may comprise a frame header 102, a scalefactors field 104, an audio samples field 106 and a padding field 108.

The frame header 102 may comprise 34 bits of binary information that indicates the configuration utilized to encode a bitstream. The scalefactors field 104 may comprise 4 bits of binary information that specifies a factor with which the samples of channel, ch, and subband, sb are multiplied. The actual scaling factor for channel, ch, and subband, sb, may be calculated according to the following equation:

scalefactor[ch][sb]=pow(2.0, (scale_factor[ch][sb]+1))

The audio samples field 106 may comprise up to 16 bits of binary information, for example. The bits in the audio samples field 106 may represent the audio sample of block, blk, in channel, ch, for subband, sb, in audio_samples[blk][ch][sb]. The padding field 108 may comprise 1 bit of binary information that may be utilized to pad the length of an audio frame to an integral number of bytes.

FIG. 1d is a diagram illustrating the exemplary frame header format of FIG. 1c, which may be utilized in connection with an embodiment of the invention. Referring to FIG. 1d, there is shown a frame header format 120. The frame header format 120 may comprise a syncword 122, a sampling frequency field 124, a blocks field 126, a channel mode field 128, an allocation method field 130, a subbands field 132, a bitpool field 134, a cyclic redundancy check (CRC) field 136, a joint stereo field 138 and a reserved for future addition (RFA) field 140.

The syncword 122 may comprise 8 bits of binary information, which may be used to synchronize the bitstream. The sampling frequency field 124 may comprise 2 bits of binary information, which may be used to indicate a sampling frequency with which the bitstream has been encoded. The blocks field 126 may comprise 2 bits of binary information, which may be used to indicate a block size with which the bitstream has been encoded. The channel mode field 128 may comprise 2 bits of binary information, which may be used to indicate the channel mode that has been encoded. The allocation method field 130 may comprise 1 bit of binary information, which may be used to indicate a bit allocation method. For example, if the bit in the allocation method field 130 is set to '0', the bit allocation method may indicate LOUDNESS. Similarly, if the bit in the allocation method field 130 is set to '1', the bit allocation method may indicate signal to noise ratio (SNR), for example.

The subbands field 132 may comprise 1 bit of binary information, which may be used to indicate a number of subbands with which the bitstream has been encoded. For example, if the bit in the subbands field 132 is set to '0', the number of subbands may be equal to 4. Similarly, if the bit in the subbands field 132 is set to '1', the number of subbands may be equal to 8, for example. The bitpool field 134 may comprise 8 bits of binary information, which may be used to indicate the size of the bit allocation pool that has been utilized to encode the bitstream. The CRC check field 136 may comprise 8 bits of binary information, and may be utilized as a parity check word to detect errors within the encoded bitstream. The joint stereo field 138 may comprise 1 bit of binary information, which may be used to indicate whether joint stereo has been used in subband sb. For example, if the bit in the joint stereo field is set to '0', the subband may be encoded in stereo mode. Similarly, if the bit in the joint stereo field is set to '1', the subband may be encoded in joint stereo mode. The RFA field 140 may comprise 1 bit of binary information, which may be set to '0' and reserved for future use.

Figure 2:
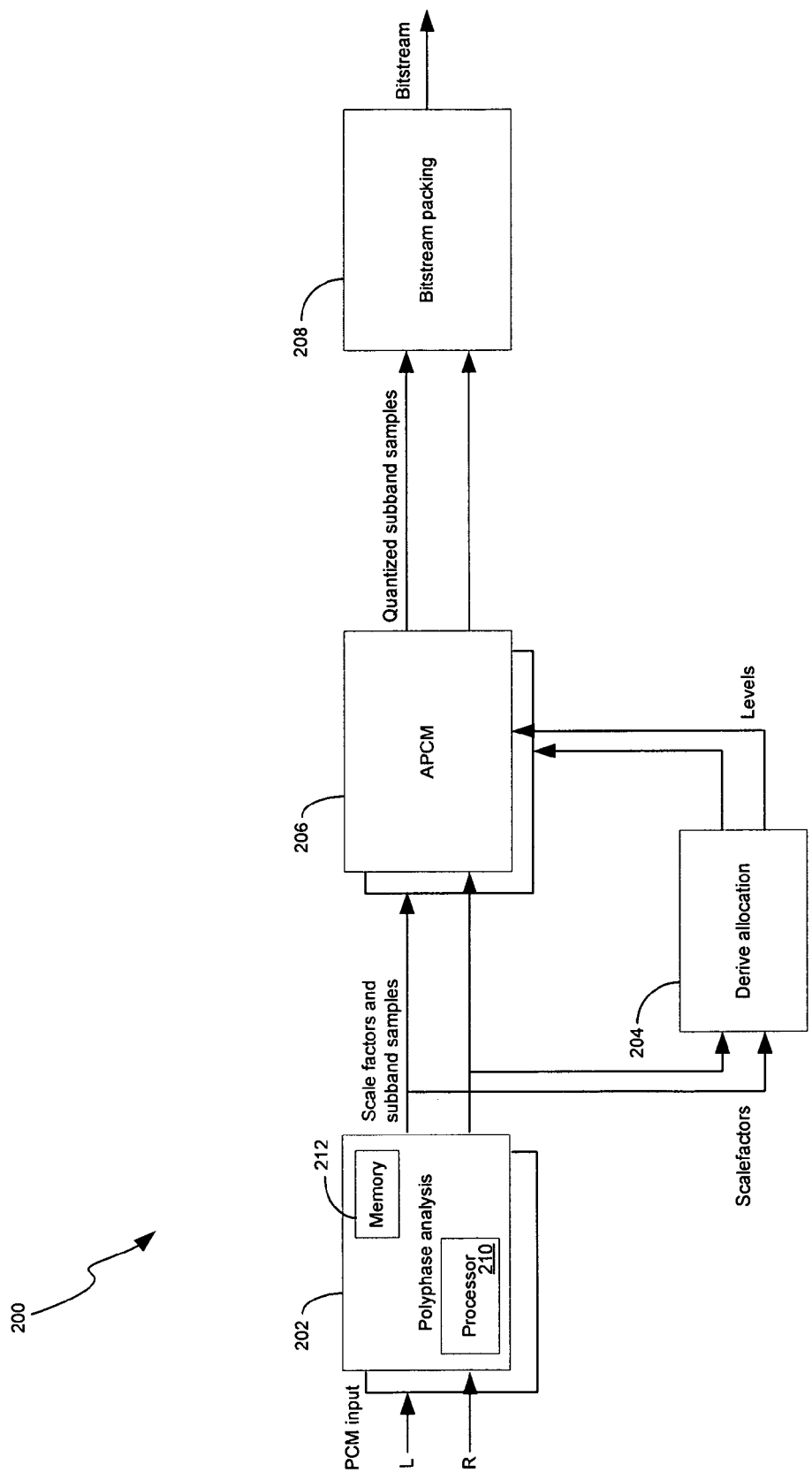
FIG. 2 is a block diagram of an exemplary Bluetooth SBC encoder that may be utilized in connection with an embodiment of the invention.

FIG. 2 is a block diagram of an exemplary Bluetooth SBC encoder that may be utilized in connection with an embodiment of the invention. Referring to FIG. 2, there is shown a SBC encoder 200. The SBC encoder 200 may comprise a polyphase analysis block 202, a derive allocation block 204, an adaptive pulse coded modulation (APCM) block 206 and a bitstream packing block 208.

The polyphase analysis block 202 may comprise suitable logic, circuitry and/or code that may be adapted to receive a plurality of pulse code modulated (PCM) input signals. The polyphase analysis block 202 may comprise at least one filter each for the left and right channels. Each filter in the polyphase analysis block 202 may comprise a processor 210 and a memory 212. The processor 210 may comprise suitable logic, circuitry and/or code that may be adapted to convert a received plurality of audio samples into a plurality of subband samples. The processor 210 may be an ARM processor, for example, or other suitable type of processor. The memory 212 may comprise suitable logic, and/or circuitry that may be adapted to store a plurality of values such as plurality of reciprocal of quantization levels computed by the processor 210. The polyphase analysis block 202 maybe adapted to analyze the received plurality of PCM signals for each channel separately. For each block of nrof_subbands consecutive PCM samples, the polyphase analysis block 202 may calculate the nrof_subbands subband samples. The nrof_subbands may be equal to 4 subbands or 8 subbands, for example. The polyphase analysis block 202 may comprise a polyphase filterbank that may be represented as $$h_m[n] = h_p[n]\cos\left(\left(m + \frac{1}{2}\right) \cdot \left(n - \frac{M}{2}\right) \cdot \frac{\pi}{M}\right), m = [0, M-1], n = [0, L-1],$$

with M=nrof_subbands and L=10 * nrof_subbands.

For the joint stereo mode of operation, a sum and difference subband signals may be derived from the L and R subband signals and the scalefactors may be calculated for these sum and difference subband signals.

The derive allocation block 204 may comprise suitable logic, circuitry and/or code that may be adapted to receive a plurality of input scalefactors from the polyphase analysis block 202. The derive allocation block 204 may be adapted to utilize the received scalefactors from the polyphase analysis block 202 and output a plurality of signals indicating the quantization levels to the APCM 206.

The APCM 206 may comprise suitable logic, circuitry and/or code that may be adapted to receive the plurality of subband samples and scalefactors from the polyphase analysis block 202 and the derive allocation block 204. The APCM 206 may be adapted to quantize the received scalefactors and subband samples from the polyphase analysis block 202 and the signals received from the derive allocation block 204. The subband samples may be normalized and quantized according to the following equation:

quantized_sb_sample[blk][ch][sb]=⌊((sb_sample[blk][ch][sb]/scalefactor[ch][sb]+1.0)*levels[ch][sb])/2.0⌋

The APCM 206 may be adapted to output a plurality of quantized subband samples to the bitstream packing block 208. The bitstream packing block 208 may comprise suitable logic, circuitry and/or code that may be adapted to receive a plurality of quantized subband samples from the APCM 206 and generate a plurality of bitstream signals to a SBC decoder, for example.

In operation, the polyphase analysis block 202 may split the received input PCM signals into subband signals. A scale factor may be calculated for each subband. The subband samples may be scaled and quantized by the APCM 206 and the derive allocation block 204. The bitstream packing block 208 may generate a bitstream utilizing the quantized subband samples received from the APCM 206.

FIG. 3a is a flowchart illustrating exemplary steps for Bluetooth SBC analysis for 4 subbands that may be utilized in connection with an embodiment of the invention. Referring to FIG. 3a, exemplary steps may start at step 302. In step 304, the polyphase analysis block 202 may receive an input of 4 new audio samples, for example, as illustrated in lines # 1-# 4.

```
#1 for i = 39 down to 4 do
#2   X[i] = X[i – 4]
#3 for i = 3 down to 0 do
#4 X[i] = next_input_audio_sample.
```

In step 306, the 4 new input audio samples may be windowed by 40 coefficients, for example, by producing a vector Z[i] as illustrated in lines # 5-# 6.

```
#5 for i = 0 to 39 do
#6   Z[i] = C[i] * X[i], where C[i] is a filter coefficient table.
```

In step 308, a partial calculation of the vector Z[i] may be performed as illustrated in lines # 7-# 9.

```
#7 for i = 0 to 7 do
#8   for k = 0 to 4 do
#9     Y[i] = sum( Z[i + k * 8]).
```

In step 310, 4 subband samples may be calculated by matrixing as illustrated in lines # 10-# 12.

```
#10 for i = 0 to 3 do
#11   for k = 0 to 7 do
#12     S[i] = sum(M[i][k] * Y[k]),
    where matrix M[i][k] = cos[(i + 0.5) * (k – 2) * pi/4]
In step 312, the 4 subband samples may be output as
illustrated in lines #13-#14.
#13 for i = 0 to 3 do
#14   next_output_subband_sample = S[i]
```

The exemplary steps may end at step 314.

FIG. 3b is a flowchart illustrating exemplary steps for Bluetooth SBC analysis for 8 subbands that may be utilized in connection with an embodiment of the invention. Referring to FIG. 3b, exemplary steps may start at step 352. In step 354, the polyphase analysis block 202 may receive an input of 8 new audio samples, for example, as illustrated in lines # 1-# 4.

```
#1 for i = 79 down to 8 do
#2   X[i] = X[i – 8]
#3 for i = 7 down to 0 do
#4   X[i] = next_input_audio_sample.
```

In step 356, the 8 new input audio samples may be windowed by 80 coefficients, for example, by producing a vector Z[i] as illustrated in lines # 5-# 6.

```
#5 for i = 0 to 79 do
#6   Z[i] = C[i] * X[i], where C[i] is a filter coefficient table.
```

In step 358, a partial calculation of the vector Z[i] may be performed as illustrated in lines # 7-# 9.

```
#7 for i = 0 to 15 do
#8   for k = 0 to 4 do
#9     Y[i] = sum( Z[i + k * 16]).
```

In step 360, 8 subband samples may be calculated by matrixing as illustrated in lines # 10-# 12.

```
#10  for i = 0 to 7 do
#11    for k = 0 to 15 do
#12      S[i] = sum(M[i][k] * Y[k]),
     where matrix M[i][k] = cos[(i + 0.5) * (k − 4) * pi/8]
```

In step 362, the 8 subband samples may be output as illustrated in lines # 13-# 14.

```
#13  for i = 0 to 7 do
#14    next_output_subband_sample = S[i]
```

The exemplary steps may end at step 364.

In an embodiment of the invention, the matrixing operation in step 360 may be efficiently computed by utilizing a fast inverse discrete cosine transform (IDCT). The number of multiplications may be reduced from 16 to 12, for example, with a marginal increase in the number of additions. The matrixing operation in step 360 is a compute intensive operation and may represent a significant part of the overall encoding time.

The matrixing operation in the SBC audio encoding subband analysis filter may be defined as $$S[i] = \sum_{k=0}^{15} \cos\left[\frac{\pi}{16}(2i+1)(k-4)\right] y[k], \, i = 0,1,\ldots,7 \quad (1)$$

where the 16 y[k] samples may be derived from 8 input audio samples from step 352 after appropriate windowing in step 354 and partial calculation in step 356.

Let y'[k] be defined as $$y'[k] = \begin{cases} y[k+4] & k = 0,1,\ldots,11 \\ -y[k-12] & k = 12,13,\ldots,15 \end{cases} \quad (2)$$

From (1) and (2), $$S[i] = \sum_{k=0}^{15} \cos\left[\frac{\pi}{16}(2i+1)k\right] y'[k], \, i = 0,1,\ldots,7 \quad (3)$$

If y"[k]=y'[k]−y'[16−k], for k=0,1, . . . ,7, (y'[16]=0) then $$S[i] = \sum_{k=0}^{7} \cos\left[\frac{\pi}{16}(2i+1)k\right] y''[k], \, i = 0,1,\ldots,7 \quad (4)$$

The DCT of a data sequence x[i], I=1, 2, . . . , N−1 is defined as $$X[i] = \frac{2}{N} e(i) \sum_{k=0}^{N-1} x[k] \cos\left[\frac{\pi}{2N}(2k+1)i\right], \, i = 0,1,\ldots,N-1 \quad (5)$$

where e(i)=1/$\sqrt{2}$ if I=0 and e(i)=1 otherwise.

The IDCT of X[i] is defined as $$x[i] = \sum_{k=0}^{N-1} e[k] X[k] \cos\left[\frac{\pi}{2N}(2i+1)k\right], \, i = 0,1,\ldots,N-1 \quad (6)$$

Comparing (4) and (6), the output S[i] of the matrixing operation in step 360 may be derived from the 8 point IDCT of y"[i], where $$y''[i] = \begin{cases} y[4] & k = 0 \\ y[k+4] + y[4-k] & k = 1,2,3,4 \\ y[k+4] - y[20-k] & k = 5,6,7 \end{cases} \quad (7)$$

The derivation of the IDCT form of the matrixing equation in step 360 is further described in, for example, "Fast subband filtering in MPEG audio coding", by K. Konstantinides, IEEE Signal Processing Letters, Vol. 1, No. 2, February 1994, which is hereby incorporated by reference in its entirety.

Let $\hat{X}[k]$=e[k]X[k] and $$G[k] = \hat{X}[2k] \quad (8)$$

$$H[k] = \hat{X}[2k+1] + \hat{X}[2k-1] \, k = 0,1,\ldots,N/2-1 \quad (9)$$

Then, $$g[i] = \sum_{k=0}^{N/2-1} G[k] \cos\left[\frac{\pi}{2(N/2)}(2i+1)k\right] \quad (10)$$

$$h[i] = \sum_{k=0}^{N/2-1} H[k] \cos\left[\frac{\pi}{2(N/2)}(2i+1)k\right] \, k = 0,1,\ldots,N/2-1 \quad (11)$$

The N-point IDCT in (6) may be decomposed into a sum of two N/2-point IDCT's as $$x[i] = g[i] + \left(1 \Big/ \left(2\cos\left[\frac{\pi}{2N}(2i+1)k\right]\right)\right) h[i] \quad (12)$$

$$x[N-1-i] = g[i] - \left(1 \Big/ \left(2\cos\left[\frac{\pi}{2N}(2i+1)k\right]\right)\right) h[i], \quad (13)$$
$$i = 0,1,\ldots,N/2-1$$

Applying N=8 in (8)-(13) for a Bluetooth subband codec with 8 subbands, $$G[k] = \hat{X}[2k] \quad (14)$$

$$H[k] = \hat{X}[2k+1] + \hat{X}[2k-1] \, k = 0,1,2,3 \quad (15)$$

-continued $$g[i] = \sum_{k=0}^{3} G[k]\cos\left[\frac{\pi}{8}(2i+1)k\right] \quad (16)$$

$$h[i] = \sum_{k=0}^{3} H[k]\cos\left[\frac{\pi}{8}(2i+1)k\right] \quad k=0,1,2,3 \quad (17)$$

$$x[i] = g[i] + \left(1/\left(2\cos\left[\frac{\pi}{16}(2i+1)k\right]\right)\right)h[i] \quad (18)$$

$$x[7-i] = g[i] - \left(1/\left(2\cos\left[\frac{\pi}{16}(2i+1)k\right]\right)\right)h[i], \, i=0,1,2,3 \quad (19)$$

The number of real multiplications for the matrixing operation in step 360 may be reduced to (N/2)log$_2$ N, which is about half the number of multiplication operations required by existing efficient algorithms. For N=8, the number of multiplications may be reduced to 12 multiplications, for example, resulting in a significant decrease in encoding time and power consumption and an increase in efficiency. The number of real additions for the matrixing operation in step 360 may be increased to (3N/2)log$_2$ N−N+1. For N=8, the number of additions may be increased from 26 to 29 additions, for example. Although, there is an increase in the number of addition operations, they are significantly less computation intensive compared to multiplication operations. The derivation and computation of the fast IDCT form of the matrixing equation in step 360 is further described in, for example, "A new algorithm to compute the Discrete Cosine Transform", by B. G. Lee, IEEE Transactions on Acoustics, Speech and Signal Processing, Vol. ASSP-32, No. 6, December 1984, which is hereby incorporated by reference in its entirety.

Figure 4:
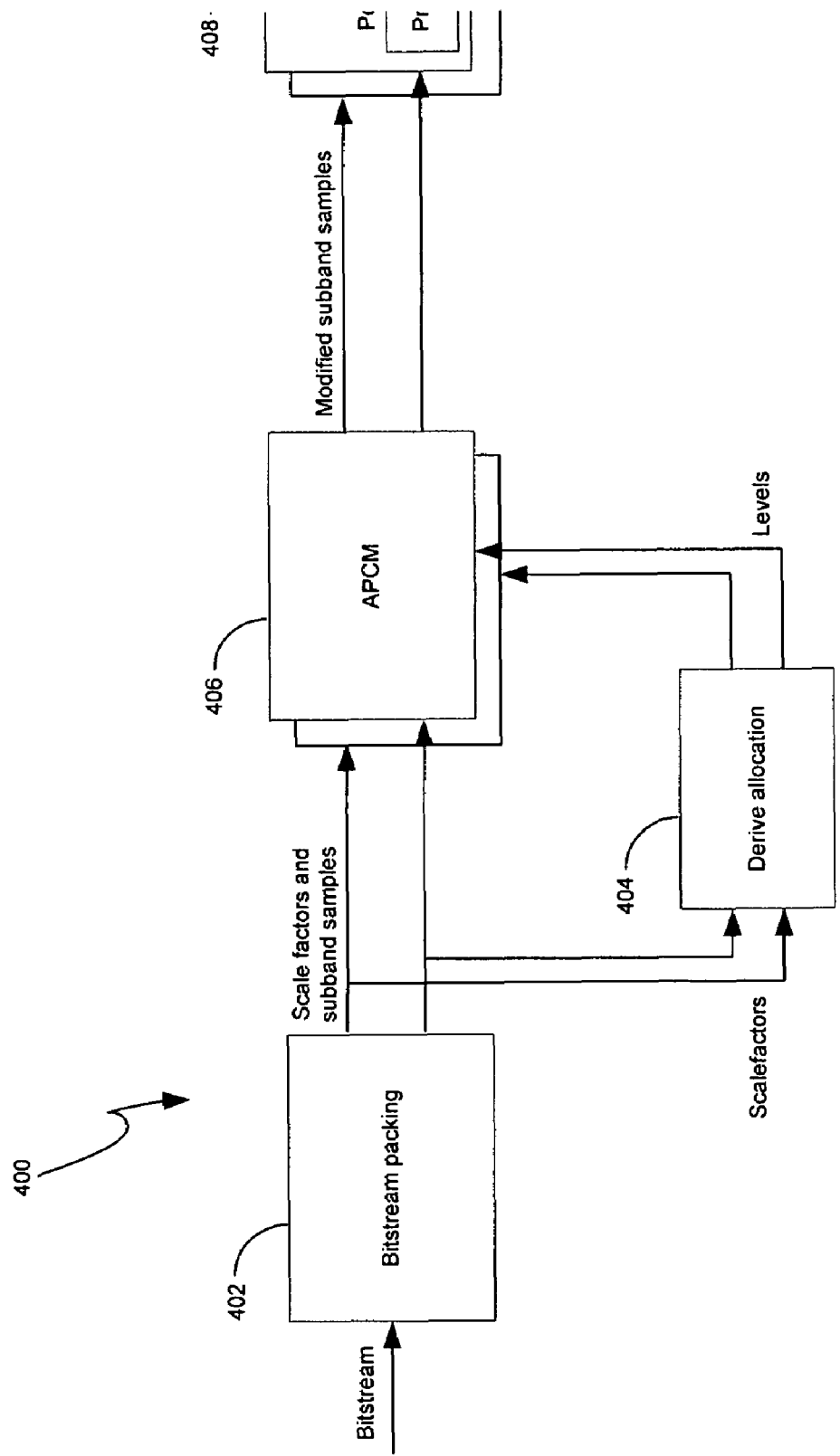
FIG. 4 is a block diagram of an exemplary Bluetooth SBC decoder that may be utilized in connection with an embodiment of the invention.

FIG. 4 is a block diagram of an exemplary Bluetooth SBC decoder that may be utilized in connection with an embodiment of the invention. Referring to FIG. 4, there is shown a SBC decoder 400. The SBC decoder 400 may comprise a bitstream unpacking block 402, a derive allocation block 404, an adaptive pulse coded modulation (APCM) block 406 and a polyphase synthesis block 408.

The bitstream unpacking block 402 may comprise suitable logic, circuitry and/or code that may be adapted to receive a plurality of input bit streams from a device, for example, an audio device. The bitstream unpacking block 402 may be adapted to decompose the received input bitstreams into sub-band signals by means of a cosine modulated filterbank, for example and output the subband samples and scalefactors to the derive allocation block 404 and the APCM 406.

The derive allocation block 404 may comprise suitable logic, circuitry and/or code that may be adapted to receive a plurality of input scalefactors from the bitstream unpacking block 402. The derive allocation block 404 may be adapted to utilize the received scalefactors from the bitstream unpacking block 402 and output a plurality of signals indicating the quantization levels to the APCM 406. By means of adaptive bit allocation, the coding errors may be shaped to remain below a masked threshold. The APCM 406 may comprise suitable logic, circuitry and/or code that may be adapted to receive the plurality of subband samples and scalefactors from the bitstream unpacking block 402 and the derive allocation block 404. The APCM 406 may be adapted to quantize the received scalefactors and subband samples from the bitstream unpacking block 402 and the signals received from the derive allocation block 404 and output a plurality of modified subband samples to the polyphase synthesis block 408.

The polyphase synthesis block 408 may comprise suitable logic, circuitry and/or code that may be adapted to receive a plurality of modified subband samples from the APCM 406. The polyphase synthesis block 408 may comprise at least one filter each for the left and right channels. Each filter in the polyphase synthesis block 408 may comprise a processor 410 and a memory 412. The processor 410 may comprise suitable logic, circuitry and/or code that may be adapted to reconstruct a plurality of audio samples based on a plurality of received subband samples. The processor 410 may be an ARM processor, for example, or other suitable type of processor. The memory 412 may comprise suitable logic, and/or circuitry that may be adapted to store a plurality of values such as plurality of reciprocal of quantization levels computed by the processor 410. The polyphase synthesis block 408 may be adapted to synthesize the received plurality of modified subband samples for each channel separately. For each block of decoded subband samples, the polyphase synthesis block 408 may be adapted to calculate nrof_subbands consecutive audio samples. The nrof_subbands may be equal to 4 subbands or 8 subbands, for example. The polyphase synthesis block 408 may comprise a polyphase filterbank that may be represented according to the following equation:

$$h_m[n] = h_p[n]\cos\left(\left(m+\frac{1}{2}\right)\cdot\left(n+\frac{M}{2}\right)\cdot\frac{\pi}{M}\right), m=[0, M-1], n=[0, L-1],$$

with M=nrof_subbands and L=10*nrof_subbands. The polyphase synthesis block 208 may be adapted to generate a plurality of pulse code modulated (PCM) output signals to the SBC encoder 200, for example, as illustrated in FIG. 2.

Figure 5A:
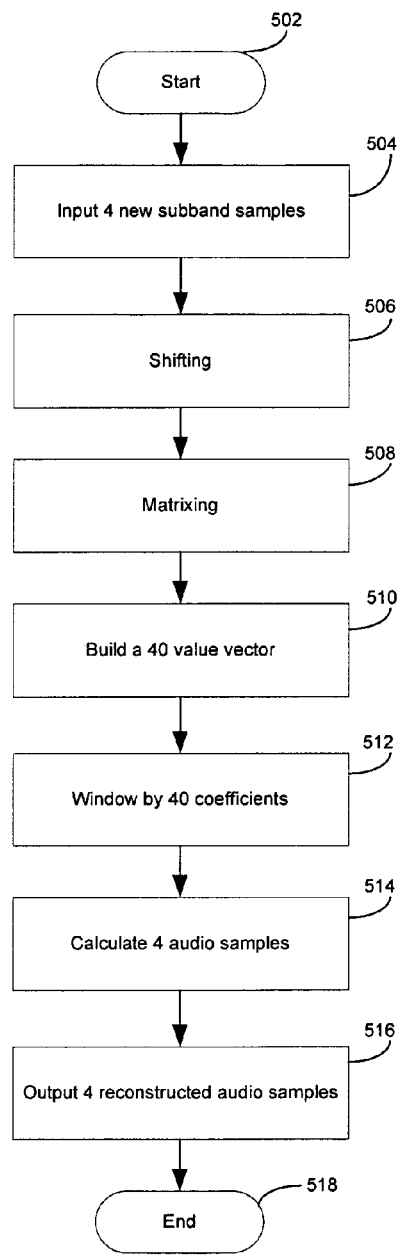
FIG. 5a is a flowchart illustrating exemplary steps for Bluetooth SBC synthesis for 4 subbands that may be utilized in connection with an embodiment of the invention.

FIG. 5a is a flowchart illustrating exemplary steps for Bluetooth SBC synthesis for 4 subbands that may be utilized in connection with an embodiment of the invention. Referring to FIG. 5a, exemplary steps may start at step 502. In step 504, the polyphase synthesis block 408 may receive an input of 4 new subband samples, for example, as illustrated in lines # 1-# 2.

```
#1 for i = 0 to 3 do
#2    S[i] = next_output_subband_sample
```

In step 506, a vector V[i] may be shifted as illustrated in lines # 3-# 4.

```
#3 for i = 79 down to 8 do
#4    V[i] = V[i − 8].
```

In step 508, a matrix N[k][i] may be utilized to generate a vector V[k] as illustrated in lines # 5-# 7.

```
#5 for k = 0 to 7 do
#6    for i = 0 to 3 do
#7        V[k] = sum(N[k][i] * S[i]), where matrix N[k][i] =
          cos[(i + 0.5) * (k + 2) * pi/4]
```

In step 510, a 40 values vector U may be generated as illustrated in lines # 8-# 11.

```
#8  for i = 0 to 4 do
#9      for j = 0 to 3 do
#10         U[i * 8 + j] = V[i * 16 + j]
#11         U[i * 8 + 4 + j] = V[i * 16 + 12 + j]
```

In step 512, a vector W[i] may be generated by windowing by 40 coefficients as illustrated in lines # 12-# 13.

```
#12  for i = 0 to 39 do
#13      W[i] = U[i] * D[i], where D[i] is a filter coefficient table.
```

In step 514, 4 audio samples may be calculated as illustrated in lines # 14-# 16.

```
#14  for j = 0 to 3 do
#15      for i = 0 to 9 do
#16          X[j] = sum( W[j + 4 * i]).
```

In step 516, the 4 reconstructed audio samples may be output as illustrated in lines # 17-# 18.

```
#17  for i = 0 to 3 do
#18      next_output_subband_sample = X[i]
```

The exemplary steps may end at step 518.

Figure 5B:
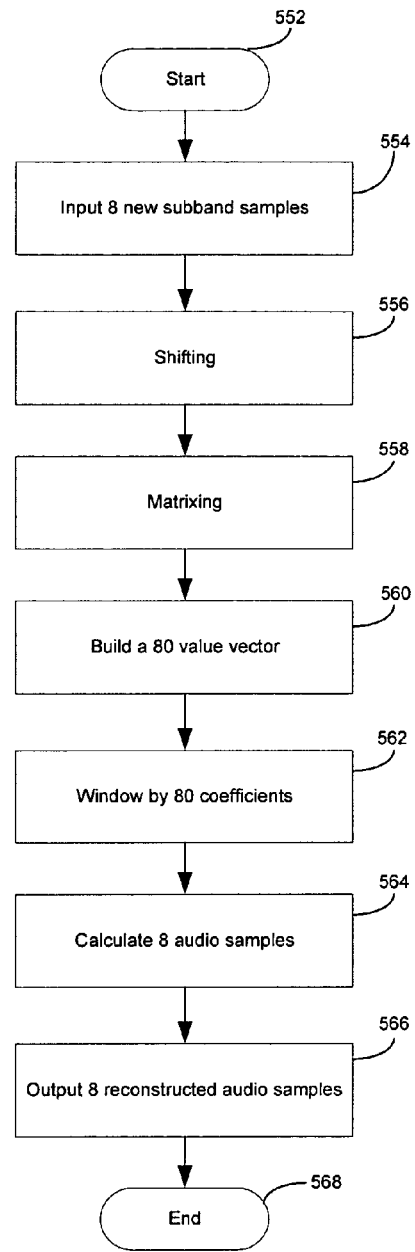
FIG. 5b is a flowchart illustrating exemplary steps for Bluetooth SBC synthesis for 8 subbands that may be utilized in connection with an embodiment of the invention.

FIG. 5b is a flowchart illustrating exemplary steps for Bluetooth SBC synthesis for 8 subbands that may be utilized in connection with an embodiment of the invention. Referring to FIG. 5b, exemplary steps may start at step 552. In step 554, the polyphase synthesis block 408 may receive an input of 8 new subband samples, for example, as illustrated in lines # 1-# 2.

```
#1  for i = 0 to 7 do
#2      S[i] = next_output_subband_sample
```

In step 556, a vector V[i] may be shifted as illustrated in lines # 3-# 4.

```
#3  for i = 159 down to 16 do
#4      V[i] = V[i – 16].
```

In step 558, a matrix N[k][i] may be utilized to generate a vector V[k] as illustrated in lines # 5-# 7.

```
#5  for k = 0 to 15 do
#6      for i = 0 to 7 do
#7          V[k] = sum(N[k][i] * S[i]), where matrix N[k][i] = cos[(i + 0.5) * (k + 4) * pi/8]
```

In step 560, a 80 values vector U may be generated as illustrated in lines # 8-# 11.

```
#8  for i = 0 to 4 do
#9      for j = 0 to 7 do
#10         U[i * 16 + j] = V[i * 32 + j]
#11         U[i * 16 + 8 + j] = V[i * 32 + 24 + j]
```

In step 562, a vector W[i] may be generated by windowing by 80 coefficients as illustrated in lines # 12-# 13.

```
#12  for i = 0 to 79 do
#13      W[i] = U[i] * D[i], where D[i] is a filter coefficient table.
```

In step 564, 8 audio samples may be calculated as illustrated in lines # 14-# 16.

```
#14  for j = 0 to 7 do
#15      for i = 0 to 9 do
#16          X[j] = sum( W[j + 8 * i]).
```

In step 566, the 8 reconstructed audio samples may be output as illustrated in lines # 17-# 18.

```
#17  for i = 0 to 7 do
#18      next_output_subband_sample = X[i]
```

The exemplary steps may end at step 568.

In an embodiment of the invention, the matrixing operation in step 558 may be efficiently computed by utilizing a fast discrete cosine transform (DCT). The number of multiplications may be reduced from 16 to 12, for example, with a marginal increase in the number of additions. The matrixing operation in step 558 is a compute intensive operation and may represent a significant part of the overall decoding time.

The matrixing operation in the SBC audio decoding subband synthesis filter may be defined as $$V[k] = \sum_{i=0}^{7} \cos\left[\frac{\pi}{16}(2i+1)(k+4)\right]S[i], k = 0,1, \ldots, 15 \quad (20)$$

where the 16 y[k] samples may be derived from 8 input subband samples from step 552 after appropriate shifting in step 554. A brute force evaluation of (20) may require 16*8=128 multiply-accumulate operations, for example.

Let V'[k] be defined as $$V'[k] = \begin{cases} V[k+12] & k = 0,1,2,3 \\ V[k-4] & k = 4,5, \ldots, 15 \end{cases} \quad (21)$$

From (21) and (22), $$V'[8+j] = -V'[8-j] \text{ for } j=1,2,3,4 \text{ and } V'[8+j] = V'[8-j] \text{ for } j=5,6,7 \quad (22)$$

If V″[k]=−V′[k], for k=0,1,2,3, and V″[k]=V′[k] for k=4, 5, 6, 7 then $$V''[k] = \sum_{i=0}^{7} \cos\left[\frac{\pi}{16}(2i+1)k\right]S[i], k = 0,1,\ldots,7 \quad (23)$$

The DCT of a data sequence x[i], I=1, 2, ..., N−1 is defined as $$X[i] = \frac{2}{N}e(i)\sum_{k=0}^{N-1} x[k]\cos\left[\frac{\pi}{2N}(2k+1)i\right], i = 0,1,\ldots,N-1 \quad (5)$$

where $e(i)=1/\sqrt{2}$ if I=0 and $e(i)=1$ otherwise.

Comparing (23) and (5), the output V[k] of the matrixing operation in step 558 may be derived from the 8-point DCT of S[i]. The derivation of the DCT form of the matrixing equation in step 558 is further described in, for example, "Fast subband filtering in MPEG audio coding", by K. Konstantinides, IEEE Signal Processing Letters, Vol. 1, No. 2, February 1994, which is hereby incorporated by reference in its entirety.

The number of real multiplications for the matrixing operation in step 558 may be reduced to $(N/2)\log_2 N$, which is about half the number of multiplication operations required by existing efficient algorithms. For N=8, the number of multiplications may be reduced to 12 multiplications, for example, resulting in a significant decrease in encoding time and power consumption and an increase in efficiency. The number of real additions for the matrixing operation in step 360 may be increased to $(3N/2)\log_2 N−N+1$. For N=8, the number of additions may be increased from 26 to 29 additions, for example. Although, there is an increase in the number of addition operations, they are significantly less computation intensive compared to multiplication operations. The derivation and computation of the fast DCT form of the matrixing equation in step 558 is further described in, for example, "A new algorithm to compute the Discrete Cosine Transform", by B. G. Lee, IEEE Transactions on Acoustics, Speech and Signal Processing, Vol. ASSP-32, No. 6, December 1984, which is hereby incorporated by reference in its entirety.

In step 564, the reconstruction of the subband samples may be calculated using the following pseudocode:

```
for (blk = 0; blk < nrof_blocks; blk++)
 { for (ch = 0; ch < nrof_channels; ch++)
  { for (sb = 0; sb < nrof_subbands; sb++)
   { if (levels[ch][sb] > 0)
    { sb_sample[blk][ch][sb] = scalefactor[ch][sb] *
     ((audio_sample[blk][ch][sb] * 2.0 + 1.0) /
     levels[ch][sb] − 1.0);}
    else
     sb_sample[blk][ch][sb] = 0;
   }
  }
 }
``` where sb_sample[blk][ch][sb] is the subband sample for each block, channel and subband, scalefactor[ch][sb] is the scalefactor for each channel and subband and the audio_sample [blk][ch][sb] is the audio sample for each block, channel and subband.

The value of the quantization levels for each channel and subband, levels[ch][sb] may be computed using the following pseudocode:

```
for (ch = 0; ch < nrof_channels; ch++)
 for (sb = 0; sb < nrof_subbands; sb++)
  levels[ch][sb] = pow(2.0, bits[ch][sb]) − 1;
```

In another embodiment of the invention, the number of millions of instructions per second (MIPS) required for the reconstruction of the subband samples may be reduced by computing and storing the values of the reciprocal of levels [ch][sb] in memory. When the number of blocks, nrof_blocks=16, for example, a maximum of 16 different values of the reciprocal of levels[ch][sb] may be stored. The value of the divisor levels[ch][sb] may remain unchanged during the entire process of the reconstruction of subband samples. These 16 pre-computed and stored values of the reciprocal of levels[ch][sb] may be utilized to compute the reconstructed subband samples to reduce the number of division operations. For example, one division operation and 16 multiplication operations may be required for every block of 16 samples, for example. The multiplication by the reciprocal of levels[ch][sb] may result in a minor rounding error that may be insignificant for 32-bit precision, for example.

In step 564, the 8 audio samples may be calculated using the following pseudocode:

```
for j = 0 to 7 do                           (24)
 for i = 0 to 9 do
  X[j] = sum( W[j + 8 * i])
```

From step 562, $$X[j] = \sum_{i=0}^{9} u[j+8i] \cdot D[j+8i] \quad j = 0,1,\ldots,7 \quad (25)$$

Implementing (25) by brute force may require 10*8=80 multiplications, for example.

In another embodiment of the invention, the number of multiplications required for the windowing operation in step 562 may be reduced by manipulating (25). Let $$X[j;t] = \quad (26)$$

$$\sum_{i=0}^{4} \{(u[j+8i;t] \cdot D[j+8i]) + (D[j+8i+40] \cdot u[j+8i+40;t])\}$$

$$j = 0,1,\ldots,7$$

where t is the clock driving the polyphase synthesis block 408 to read 8 subband samples and output 8 PCM audio samples.

Using the identity $$ab+cd=(a+c)(b+d)-ad-bc \quad (27)$$

From (27) and (26), $$X[j;t]=A[j;t]-B[j;t]-C[j]j=0,1,\ldots,7 \quad (28)$$

where, $$A[j; t] = \sum_{i=0}^{4} \{(u[j+8i; t] + D[j+8i+40]) \cdot (D[j+8i] + u[j+8i+40; t])\} \quad (28a)$$

$$B[j; t] = \sum_{i=0}^{4} \{(u[j+8i; t] \cdot u[j+8i+40; t])\} \quad (28b)$$

$$C[j] = \sum_{i=0}^{4} \{(D[j+8i] \cdot D[j+8i+40])\} \quad (28c)$$

The values of C[j] may be pre-calculated and stored in memory as the values of D are filter coefficients. The computation of A[j;t] may require 5*8=40 multiplications, for example.

In an embodiment of the invention, a recursive algorithm may be utilized to reduce the number of multiplications for B[j;t]. Rewriting (28b), $$B[j; t] = \sum_{i=0}^{2} \{(u[j+16i; t] \cdot u[j+16i+40; t])\} + \sum_{i=0}^{1} \{(u[j+16i+8; t] \cdot u[j+16i+48; t])\}$$

for $j = 0,1, \ldots ,7$ (29)

From step 560, $$U[i*16+j] = V[i*32+j] \quad (30)$$

$$U[i*16+8+j] = V[i*32+24+j] \quad (31)$$

Using (30) and (31) in (29), $$B[j; t] = \sum_{i=0}^{2} (V[j+32i; t] \cdot V[j+32i+80; t]) + \sum_{i=0}^{1} (V[j+32i+24; t] \cdot V[j+32i+128; t]) \quad (32)$$

From step 556, a vector V[i] may be shifted according to for i=159 down to 16 do $$V[i] = V[i-16] \quad (33)$$

From step 558, a matrix N[k][i] may be utilized to generate a vector V[k] according to for k=0 to 15 do for i=0 to 7 do $V[k]=\text{sum}(N[k][i]*S[i])$, where matrix $N[k][i]=\cos[(i+0.5)*(k+4)*pi/8]$ (34)

At the current synthesis filtering time t, 16 new V[i] values may be determined according to (33) and (34). From (33) and (34), $$V[i; t] = V[i-16; t-1], i=16, 17, \ldots, 159 \quad (35)$$

The previous iteration of (35) may be calculated as, $$V[i; t] = V[i-32; t-2], i=32, 33, \ldots, 159 \quad (36)$$

The previous iteration of (36) may be calculated as, $$V[i; t] = V[i-48; t-3], i=48, 49, \ldots, 159 \quad (37)$$

From (35)-(37), $$V[i; t] = V[i-16n; t-n], i=16n, \ldots, 159 \quad (38)$$

Let, $$d_1[j; t] = V[j; t] \cdot V[j+80; t] \quad (39)$$

$$d_2[j; t] = V[j+24; t] \cdot V[j+128; t] \quad (40)$$

Using (32), (38), (39) and (40), $$B[j; t] - B[j; t-2] = d_1[j; t] + d_2[j; t] - d_1[j; t-6] - d_2[j; t-4] \quad (41)$$

Using 3 delay lines, for example, one each for d1, d2 and B, the number of multiplications required for the windowing process in step 562 may be reduced from 80 multiplications to around 40 multiplications, for example, resulting in a significant decrease in decoding time and power consumption and an increase in efficiency.

Figure 5C:
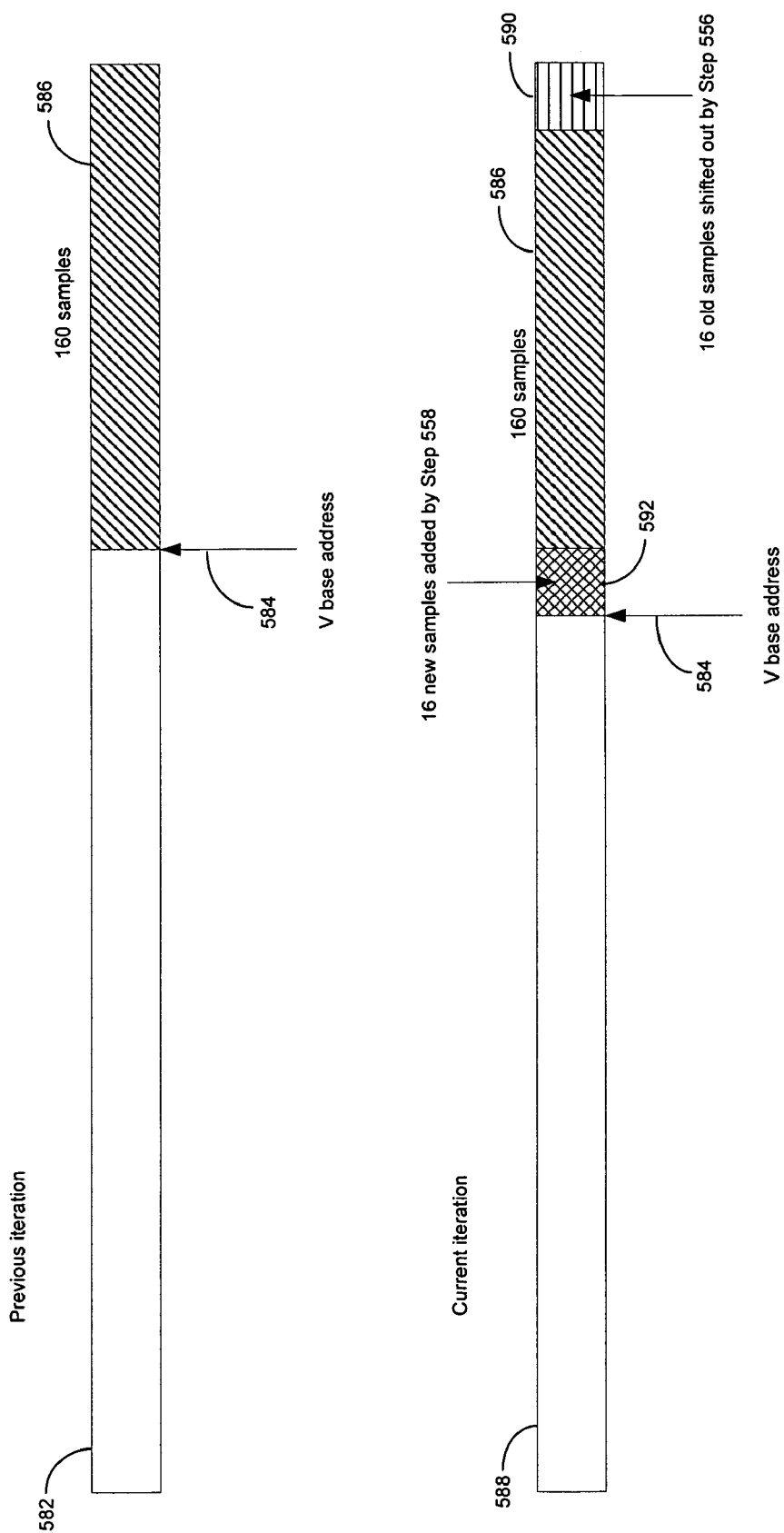
FIG. 5c is a diagram illustrating modifying a pointer index without moving data, in accordance with an embodiment of the invention.

FIG. 5c is a diagram illustrating modifying a pointer index without moving data, in accordance with an embodiment of the invention. Referring to FIG. 5c, there is shown a state of a buffer during a previous iteration 582, a pointer to base address of a matrix 584, a sample portion of the buffer 586, a state of a buffer during a current iteration 588, sample portion of the buffer shifted out 590 and a sample portion of the buffer shifted in 592. Referring to step 556 (FIG. 5b), at the end of an iteration, the pointer to base address of a vector V[i] 584 may indicate the sample portion of the buffer 586. The sample portion of the buffer 586 may comprise 160 samples, for example. In the current iteration of the state of the buffer 588, the sample portion of the buffer 586 may be shifted by 16 samples, for example. For each iteration in step 556, instead of copying data the pointer to the base address of vector V[i] 586 may be shifted by 16 samples, for example. The sample portion of the buffer shifted out 590 may comprise 16 samples, for example. In step 558, the sample portion of the buffer shifted in 592 may comprise 16 samples, for example. Notwithstanding, the pointer index may be modified for vector U[i] without moving data, in accordance with an embodiment of the invention.

The array V may be restructured into 20 groups, for example, and each group may have 8 samples, for example.

$$G[i] = \{V[8*i], V[8*i+1], V[8*i+2], V[8*i+3], V[8*i+4], V[8*i+5], V[8*i+6], V[8*i+7]\},$$

where i=0, 1, 2, . . . , 19. A sizeable memory space may be allocated for UV[0] and UV[1] according to the following pseudocode:

```
int turn = 0;
long newV[16];
long UVBase[2];
long UV[2][72+128];
```

In accordance with an embodiment of the invention, in step 560 (FIG. 5b), a UV array may be generated as illustrated in lines # 1-# 19:

```
#1  UVBase[0] -= 8;
#2  UVBase[1] -= 8;
#3  If (turn == 0)
#4  {
#5     for i = 0 to 7 do
#6     {
#7        UV[0][UVBase[0]+i] = newV[i];
#8        UV[1][UVBase[1]+i] = newV[i + 8];
#9     }
#10 }
#11 else
#12 if (turn == 1)
#13 {
#14    for i = 0 to 7 do
#15    {
#16       UV[1][UVBase[0]+i] = newV[i];
#17       UV[0][UVBase[1]+i] = newV[i + 8];
#18    }
#19 }
```

In accordance with an embodiment of the invention, in step 562, a vector W[i] may be generated by windowing by 80 coefficients according to the following pseudocode:

```
for i = 0 to 79 do
    W[i] = UV[turn][UVBase[turn] + i] * D[i];
```

The turn value may be flipped according to the following pseudocode:

```
if(turn == 0) {turn = 1;}
else turn = 0;
```

The generation of the UV vector by moving the pointer index instead of copying data may save a significant number of cycles.

Figure 6:
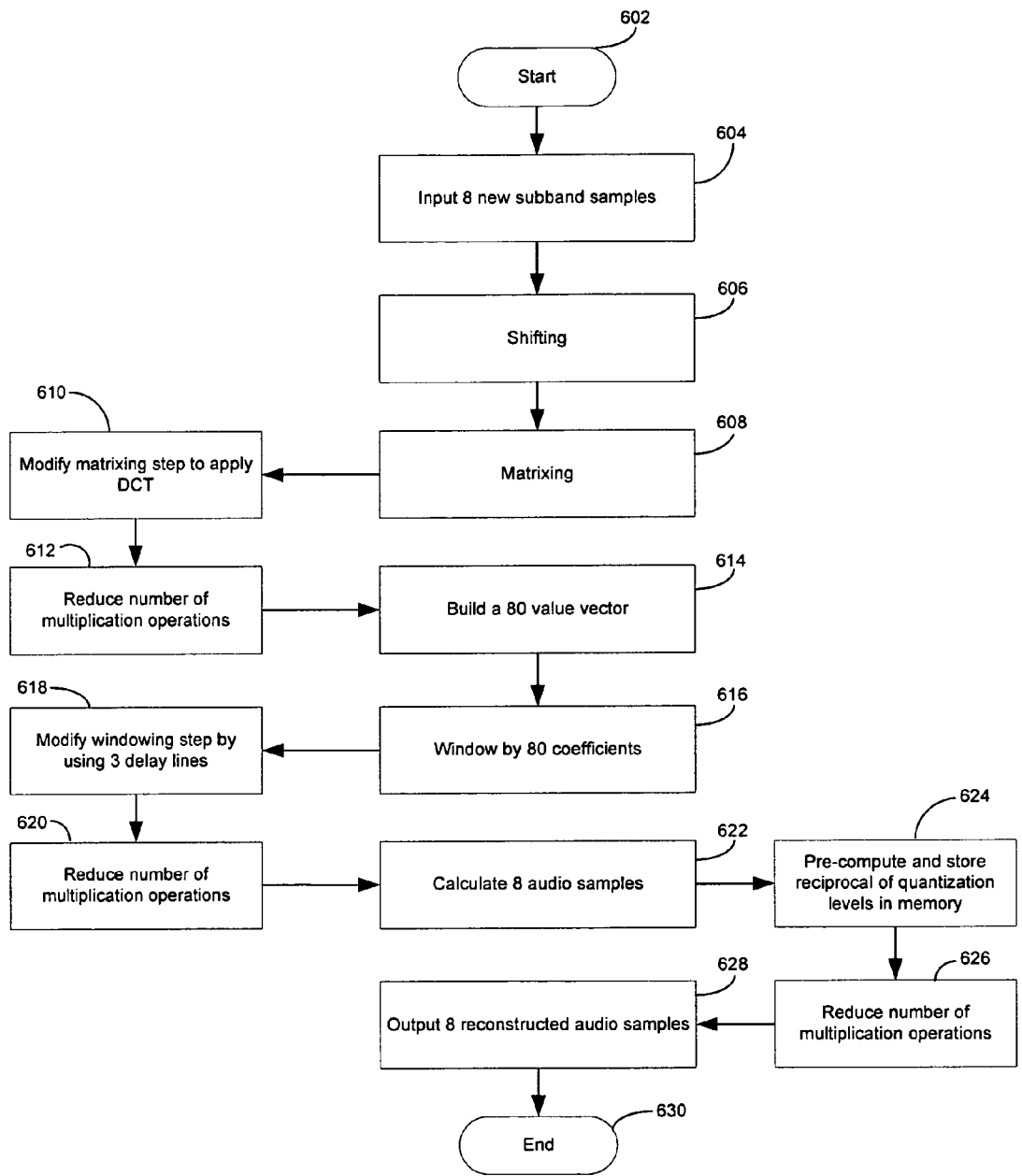
FIG. 6 is a flowchart illustrating exemplary steps for efficient implementation of the Bluetooth subband codec, in accordance with an embodiment of the invention.

FIG. 6 is a flowchart illustrating exemplary steps for efficient implementation of the Bluetooth subband codec, in accordance with an embodiment of the invention. Referring to FIG. 6, exemplary steps may start at step 602. In step 604, a processor, for example, processor 410 (FIG. 4) may receive a plurality of subband samples, for example, 8 subband samples. In step 606, the plurality of received subband samples may be appropriately shifted. In step 608, a matrix N[k][i] may be utilized to generate a vector V[k] according to the following pseudocode:

```
for k = 0 to 15 do
    for i = 0 to 7 do
        V[k] = sum(N[k][i] * S[i]), where matrix
        N[k][i] = cos[(i + 0.5) * (k + 4) * pi/8]
```

In step 610, the matrixing operation in step 608 may be efficiently computed by utilizing a fast discrete cosine transform (DCT). The derivation of the DCT form of the matrixing equation in step 608 is further described in, for example, "Fast subband filtering in MPEG audio coding", by K. Konstantinides, IEEE Signal Processing Letters, Vol. 1, No. 2, February 1994, which is hereby incorporated by reference in its entirety. In step 612, the number of real multiplications for the matrixing step 608 may be reduced to $(N/2)\log_2 N$. For 8 subbands, for example, N=8, the number of multiplications may be reduced to 12 multiplications, for example. In step 614, a vector U may be generated using the following pseudo code. For example, for 8 subbands,

```
for i = 0 to 4 do
    for j = 0 to 7 do
        U[i * 16 + j] = V[i * 32 + j]
        U[i * 16 + 8 + j] = V[i * 32 + 24 + j]
```

In step 616, a vector W[i] may be generated by windowing by 80 coefficients, for example, for 8 subbands using the following pseudo code:

```
for i = 0 to 79 do
    W[i] = U[i] * D[i], where D[i] is a filter coefficient table.
```

In step 618, the vector W[i] may be modified by suitable manipulations and using 3 delay lines, for example. In step 620, the number of multiplications required for the windowing process in step 616 may be reduced from 80 multiplications to around 40 multiplications, for example.

In step 622, a plurality of audio samples, for example, 8 audio samples for 8 subbands may be calculated using the following pseudo code:

```
for j = 0 to 7 do
    for i = 0 to 9 do
        X[j] = sum( W[j + 8 * i]).
```

In step 624, the processor 410 may be adapted to utilize a stored pre-computed plurality of reciprocal of quantization levels to reconstruct the plurality of audio samples. In step 626, the processor 410 may be adapted to reduce a plurality of multiplication operations of the reconstruction of the plurality of audio samples based on the utilization of the stored pre-computed plurality of reciprocal of quantization levels. In step 628, a plurality reconstructed audio samples, for example, 8 audio samples, for 8 subbands may be output using the following pseudo code:

```
for i = 0 to 7 do
    next_output_subband_sample = X[i]
```

The exemplary steps may end at step 630.

In accordance with an embodiment of the invention, a system for implementing a codec may comprise at least one processor, for example, processor 410 for at least one of inverse discrete cosine transforming windowed data corresponding to a plurality of input audio samples during encoding by a Bluetooth subband codec and discrete cosine transforming shifted subband samples during decoding by the Bluetooth subband codec. The processor 410 may be adapted to reconstruct the input audio samples from the discrete cosine transforming of the shifted subband samples. The processor 410 may be adapted to execute the inverse discrete cosine transforming during a matrix operation of the encoding. The processor 410 may be adapted to execute the discrete cosine transforming during a matrix operation of the decoding. The processor 410 may be adapted to perform a reduced number of multiplication operations based on executing at least one of: discrete cosine transforming during the matrix operation of the decoding and the inverse discrete cosine transform during the matrix operation of the encoding. The number of real multiplications for the matrix operation may be reduced to $(N/2)\log_2 N$. For 8 subbands, N=8, the number of multiplications may be reduced to 12 multiplications, for example.

The processor 410 may be adapted to window the input audio samples during the encoding prior to a matrix operation via a plurality of delay lines. The processor 410 may be adapted to generate a vector during a matrix operation of the decoding. The processor 410 may be adapted to window audio data associated with the generated vector by a plurality of filter coefficients via a plurality of delay lines. The number of multiplications required for the windowing step may be reduced from 80 multiplications to around 40 multiplications, for example.

The processor 410 may be adapted to pre-compute a plurality of reciprocal quantization levels for each channel and each subband to reconstruct the plurality of input audio samples. A memory, for example, memory 412 may be adapted to store the pre-computed plurality of reciprocal quantization levels for each channel and each subband to reconstruct the plurality of input audio samples. The processor 410 may be adapted to sum the stored pre-computed plurality of reciprocal quantization levels for each channel and each subband to reconstruct the plurality of input audio samples.

The number of millions of instructions per second (MIPS) required for the reconstruction of the plurality of input audio samples may be reduced by computing and storing the values of the reciprocal of levels[ch][sb] in memory. When the number of blocks, nrof_blocks=16, for example, a maximum of 16 different values of the reciprocal of levels[ch][sb] may be stored. The value of the divisor levels[ch][sb] may remain unchanged during the entire process of the reconstruction of the plurality of input audio samples. These 16 pre-computed and stored values of the reciprocal of levels[ch][sb] may be utilized to reconstruct the plurality of input audio samples to reduce the number of division operations.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for implementing a codec, the method comprising at least one of:

inverse discrete cosine transforming windowed data corresponding to a plurality of input audio samples during encoding by a Bluetooth subband codec; and discrete cosine transforming shifted subband samples during decoding by said Bluetooth subband codec.

2. The method according to claim 1, comprising reconstructing said input audio samples from said discrete cosine transforming said shifted subband samples.

3. The method according to claim 1, comprising executing said inverse discrete cosine transforming during a matrix operation of said encoding.

4. The method according to claim 1, comprising executing said discrete cosine transforming during a matrix operation of said decoding.

5. The method according to claim 1, comprising windowing said input audio samples during said encoding prior to a matrix operation.

6. The method according to claim 1, comprising:

generating a vector during a matrix operation of said decoding; and windowing audio data associated with said generated vector by a plurality of filter coefficients.

7. The method according to claim 1, comprising pre-computing a plurality of reciprocal quantization levels for each channel and each subband to reconstruct said plurality of input audio samples.

8. The method according to claim 7, comprising storing said pre-computed said plurality of reciprocal quantization levels in memory for each said channel and each said subband to reconstruct said plurality of input audio samples.

9. The method according to claim 7, comprising summing said stored said pre-computed said plurality of reciprocal quantization levels for each said channel and each said subband to reconstruct said plurality of input audio samples.

10. A memory storage having stored thereon, a computer program having at least one code section for implementing a codec, the at least one code section being executable by a machine for causing the machine to perform steps comprising at least one of:

inverse discrete cosine transforming windowed data corresponding to a plurality of input audio samples during encoding by a Bluetooth subband codec; and discrete cosine transforming shifted subband samples during decoding by said Bluetooth subband codec.

11. A memory storage according to claim 10, wherein said at least one code section comprises code for reconstructing said input audio samples from said discrete cosine transforming said shifted subband samples.

12. A memory storage according to claim 10, wherein said at least one code section comprises code for executing said inverse discrete cosine transforming during a matrix operation of said encoding.

13. A memory storage according to claim 10, wherein said at least one code section comprises code for executing said discrete cosine transforming during a matrix operation of said decoding.

14. A memory storage according to claim 10, wherein said at least one code section comprises code for windowing said input audio samples during said encoding prior to a matrix operation.

15. A memory storage according to claim 10, wherein said at least one code section comprises code for:
generating a vector during a matrix operation of said decoding; and
windowing audio data associated with said generated vector by a plurality of filter coefficients.

16. A memory storage according to claim 10, wherein said at least one code section comprises code for pre-computing a plurality of reciprocal quantization levels for each channel and each subband to reconstruct said plurality of input audio samples.

17. A memory storage according to claim 16, wherein said at least one code section comprises code for storing said pre-computed said plurality of reciprocal quantization levels in memory for each said channel and each said subband to reconstruct said plurality of input audio samples.

18. A memory storage according to claim 16, wherein said at least one code section comprises code for summing said stored said pre-computed said plurality of reciprocal quantization levels for each said channel and each said subband to reconstruct said plurality of input audio samples.

19. A system for implementing a codec, the system comprising at least one of:
at least one processor comprising a Bluetooth subband codec, said at least one processor is operable to inverse discrete cosine transforms windowed data corresponding to a plurality of input audio samples during encoding; and
said at least one processor is operable to discrete cosine transforms shifted subband samples during decoding.

20. The system according to claim 19, wherein said at least one processor is operable to reconstruct said input audio samples from said discrete cosine transformed said shifted subband samples.

21. The system according to claim 19, wherein said at least one processor is operable to executes said inverse discrete cosine transforming during a matrix operation of said encoding.

22. The system according to claim 19, wherein said at least one processor is operable to execute said discrete cosine transforming during a matrix operation of said decoding.

23. The system according to claim 19, wherein said at least one processor is operable to window said input audio samples during said encoding prior to a matrix operation.

24. The system according to claim 19, wherein said at least one processor is operable to:
generate a vector during a matrix operation of said decoding; and
window audio data associated with said generated vector by a plurality of filter coefficients.

25. The system according to claim 19, wherein said at least one processor is operable to pre-compute a plurality of reciprocal quantization levels for each channel and each subband to reconstruct said plurality of input audio samples.

26. The system according to claim 25, comprising a memory that is operable to store said pre-computed said plurality of reciprocal quantization levels for each said channel and each said subband to reconstruct said plurality of input audio samples.

27. The system according to claim 25, wherein said at least one processor is operable to sum said stored said pre-computed said plurality of reciprocal quantization levels for each said channel and each said subband to reconstruct said plurality of input audio samples.

* * * * *